United States Patent [19]
Hwong et al.

[11] Patent Number: 5,093,907
[45] Date of Patent: Mar. 3, 1992

[54] GRAPHIC FILE DIRECTORY AND SPREADSHEET

[75] Inventors: Yao D. Hwong; Mitsuro Kaneko, both of Tustin, Calif.

[73] Assignee: AXA Corporation, Irvine, Calif.

[21] Appl. No.: 412,281

[22] Filed: Sep. 25, 1989

[51] Int. Cl.⁵ ............................................. G06F 15/62
[52] U.S. Cl. ................................................... 395/152
[58] Field of Search ............... 364/518, 521; 340/721, 340/723, 734, 747, 725, 735, 726; 358/140

[56] References Cited

U.S. PATENT DOCUMENTS

| | | | |
|---|---|---|---|
| 4,486,745 | 12/1984 | Konno | 340/735 X |
| 4,513,390 | 4/1985 | Walter et al. | 364/900 |
| 4,531,120 | 7/1985 | Brownell, Jr. et al. | 340/735 X |
| 4,567,480 | 1/1986 | Blanchard | 340/711 X |
| 4,580,782 | 4/1986 | Ochi | 364/521 X |
| 4,725,830 | 2/1988 | Kawai et al. | 340/711 X |
| 4,760,390 | 7/1988 | Maine et al. | 340/747 |
| 4,844,637 | 7/1989 | Buisson et al. | 340/711 X |
| 4,849,745 | 7/1989 | Satou | 340/723 |
| 4,864,517 | 9/1989 | Maine et al. | 364/518 X |
| 4,876,596 | 10/1989 | Faroudja | 358/140 |
| 4,885,574 | 12/1989 | Negishi et al. | 340/711 |

OTHER PUBLICATIONS

*Microsoft Works Reference,* 1989, pp. 180–237.

Primary Examiner—Heather R. Herndon
Attorney, Agent, or Firm—Harry G. Weissenberger; Gordon L. Peterson

[57] ABSTRACT

A combined visual directory and spreadsheet for graphic files is disclosed. Graphic files can be selectively associated with cells of a matrix. A selectable portion of the matrix containing miniaturized versions of the graphic files associated with the cells of that portion is displayed on an editing monitor. Graphic functions of various kinds can be assigned to displayed cells by the operator to produce modification, animation, or display of graphics associated with selected cells.

21 Claims, 7 Drawing Sheets

GRAPHIC FILE DIRECTORY AND SPREADSHEET

FIELD OF THE INVENTION

This invention relates to the visual manipulation of graphic data on a computer, and more particularly to a combination graphic directory and spreadsheet system for creating, modifying, combining and displaying graphic data files.

BACKGROUND OF THE INVENTION

In many scientific and commercial applications, it is necessary to combine and manipulate massive amounts of graphic data existing in the form of large numbers of individual bit-mapped data files. For example, in creating animation, the animated picture may contain many individually moving components, each of which may occupy many different positions in the various frames of a moving picture sequence.

Various techniques exist for drawing, modifying, cutting, posting, importing and exporting graphic data in a graphic file, but none of these techniques allow the operator to cause several graphic files to interact with each other in accordance with operator-selected rules or functions.

Furthermore, in the conventional disk operating system (DOS), each graphic file to be created or manipulated must have an alphanumeric file name in the file directory for storage and retrieval. When large numbers of graphic files are stored in memory, the normal DOS directory approach can rapidly become quite awkward for a human operator to use.

SUMMARY OF THE INVENTION

The invention simultaneously provides the user with a graphic file directory featuring a visual indication of the contents of the files in the directory, and with the ability to display, edit or combine files selected in the directory in accordance with a wide variety of selectable functions.

More specifically, graphic files are stored full-size in memory. A matrix of cells is then created, the cells being addressable individually or in groups. Any file in memory can be associated at will with any desired cell, and any cell can also be associated with a function designed to create a new file or to modify, combine or display the graphic information in the file associated with the cell.

In accordance with the invention, a graphic file directory is provided by displaying a grid of cells corresponding to a selected portion of the matrix, each cell in the grid being displayed in the form of a miniaturized version of the graphic contents of the file associated with that cell. In that manner, it is unnecessary for the user to know the names of the files in memory as they can be visually identified in the displayed grid.

Individual cells or groups of cells in the displayed grid can be selected by any convenient means, e.g. by using a mouse, and graphic functions can be assigned to the selected cell or cells just as mathematical functions can be assigned to the cells of a spreadsheet.

As a matter of example, graphic functions might include producing an enlarged version of an object in a designated other cell; producing a graphic file like that of another cell but with an object moved a certain distance; combining the graphics of one or more cells; displaying a cell full-size on a monitor for a certain length of time; reproducing the graphics of another cell in a different color; or displaying the graphics of a cell for manual editing by the user.

Just as in a spreadsheet, changing the graphic contents of any cell also changes the contents of all cells whose functions refer to the changed cell.

DESCRIPTION OF THE PREFERRED EMBODIMENT

Figure 1:
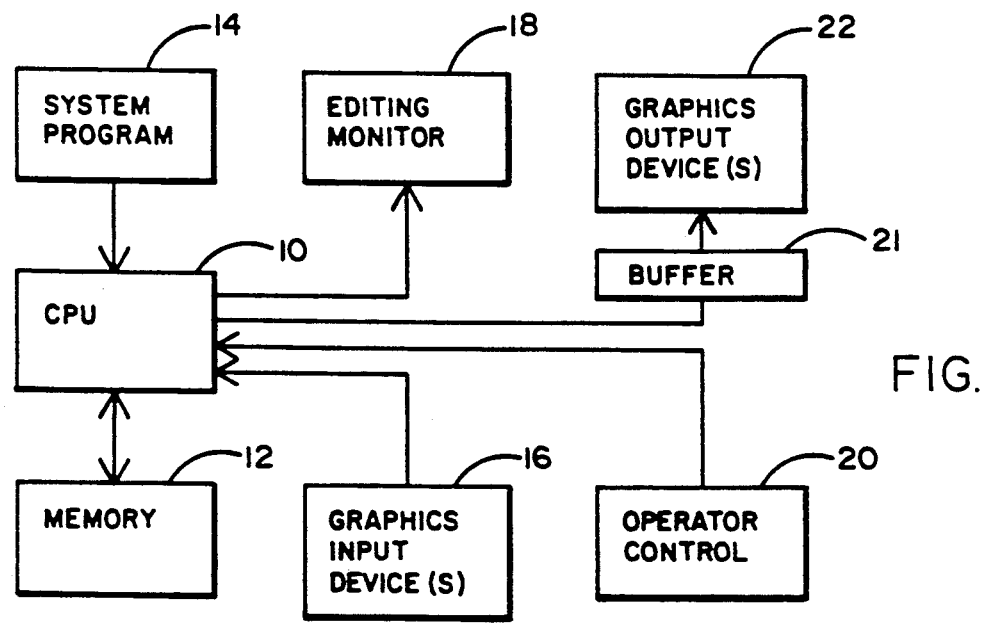
FIG. 1 is a block diagram of the apparatus involved in the practice of the invention.

The basic hardware components of the inventive system are shown in FIG. 1. A central processor unit (CPU) 10 with its associated mass storage memory 12 is under the control of the system program 14. Graphic file data can be entered into the CPU 10 by one or more input devices 16 which, in the example decribed below, may be a scanner, video camera, electronic drawing tool, light pen, or any other device capable of creating graphic data.

The memory 12 contains two kinds of information: cell information and file information. Cell information consists of registers containing the location or address 15 (FIG. 3a) of any cell 27 in an infinite multidimensional matrix 32 (FIG. 3b), the contents or identity (17) of the graphic file associated with that cell, and a graphic function 19 associated with the cell 27. File information consists of the contents of individual graphic files which can be manipulated by the system of this invention.

The directory created by this invention displays, on an editing monitor 18, miniaturized images of the graphic files associated with the cells 27 of selectable portions of the matrix 32. The portion of the matrix 32 to be displayed can be selected by an operator control 20 which may be a mouse or other appropriate control device. The output of the system may take the form of an output buffer 21 feeding one or more graphic output devices 22 such as a monitor, video recorder, printer, or other suitable apparatus.

Figure 2:
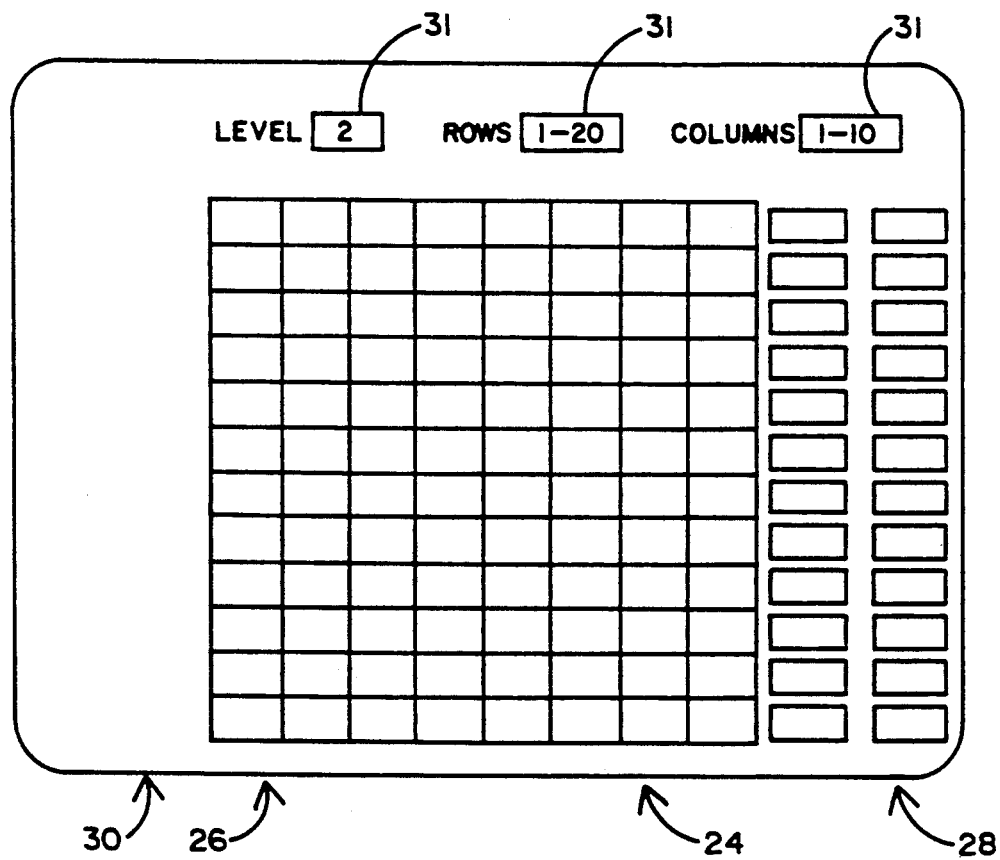
FIG. 2 is a representation of the editing monitor window or screen.

As best seen in FIG. 2, the editing monitor 18 displays a scrollable window 24 composed of selected miniaturized images 25. In the preferred embodiment, it may also display a function information in a function bar 26, as well as selectable control buttons 28 for selecting functions or operating the various manipulative features of the system program as discussed below. The control buttons 28 may be selectable, for example, by a mouse and pointer, or they may be touch-sensitive portions of the screen of monitor 18 which initiate and control, in a conventional manner, the graphic functions mentioned above. In addition, the editing monitor 18 may, if desired, display a note area 30 (which scrolls together with the rows of the matrix 32) for annotating selected rows of the matrix 32. Indicators 31 may also be provided to advise the operator which level and which area of the matrix 32 are being displayed in the window 24.

Figure 3:
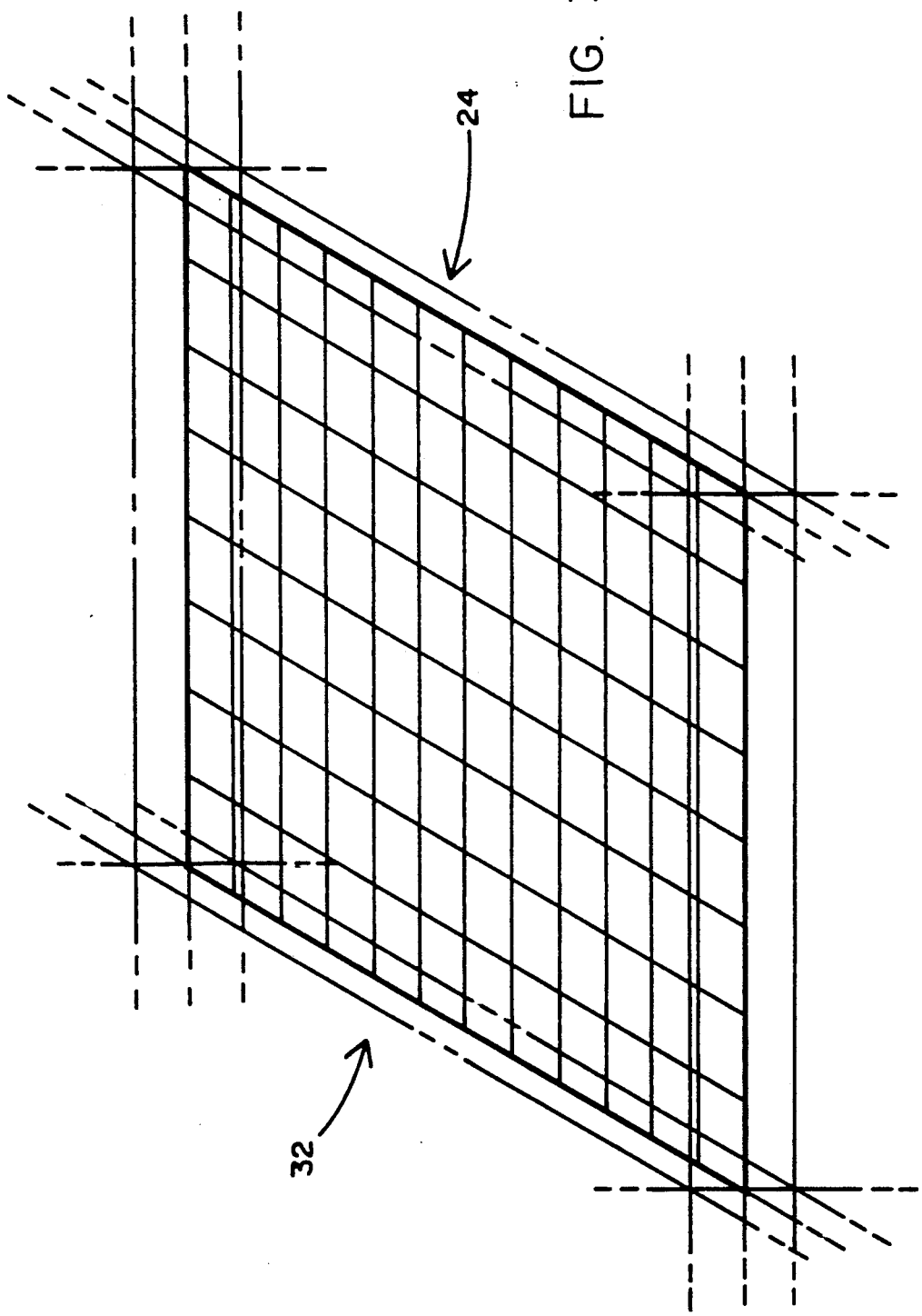
FIGS. 3a and 3b are perspective illustrations of a three-dimensional directory matrix.

FIGS. 3a and 3b illustrate the makeup of the cell matrix 32. In these figures, the matrix 32 is shown as a three-dimensional array; however, it will be understood that it may have more or fewer dimensions as the circumstances of a particular application may dictate. As best shown in FIG. 3b, the matrix 32 is preferably as large in each of its dimensions as the physical limitations of the memory 12 will allow. Any part 24 of the matrix 32 may be selected by an operator for display on the editing monitor 18 as shown in FIG. 2.

FIG. 3a shows the makeup of the individual cells 27 of the matrix 32. Each cell 27 contains an address 15 (which may simply be its physical location in the memory 12), a graphics section 17 (which may preferably be the memory address, name, or other identification of a graphics file in memory 12 so that graphics files can be associated at will with different cells), and a function section 19 (which determines what is to be done to or by the graphics file identified in the graphics section 17).

When specified cells of FIG. 3a are selected for display on the editing monitor 18, the graphic contents of each cell 27 are displayed in miniature in the window 24. The address 15 is preferably not displayed because it is evident from the position of the cell display in the window 24; nor is the function 19 displayed because it is typically evident from the appearance of the displayed file contents, or else it can advantageously be displayed in the function bar 26.

Just as a number in a conventional spread sheet cell can be computed or used by a wide variety of mathematical functions, the graphics in the file associated with any cell 27 can be used, created or manipulated in a wide variety of ways. For example, the function 19 for a given cell might be "enlarge center portion of left-adjacent cell two times", or "combine all displayed graphics in this row in left-to-right hierarchical position", or "display this cell on output monitor for 1/30 second following display of above-adjacent cell", or "copy left-adjacent cell with red circles changed to blue triangles", or "display this cell on output monitor for manual modification".

Because the function in a cell of the inventive system can refer back to the graphics of another cell, any change in the latter automatically translates into a corresponding change in the former.

The operation of the invention is best illustrated by the example shown in FIGS. 4–8. This example illustrates the use of the invention in producing an animated video picture. Typically, an animated picture includes a background against which moving picture components move. Each component may have its own motion which, in the course of a, say 60 frame sequence (2 seconds of video) may or may not match the motion of other components.

Consequently, each frame of a moving picture depicting, for example, a child throwing a ball to a dog in front of a street might be composed of a background (the street), and several independently moving components (the child, the dog, the ball, and cars on the street). The child, in turn, may be composed of a body, legs, and arms, each of which have a different motion in the sequence. The same is true of the dog and the cars, but not of the ball which moves as a unit.

Figure 4:
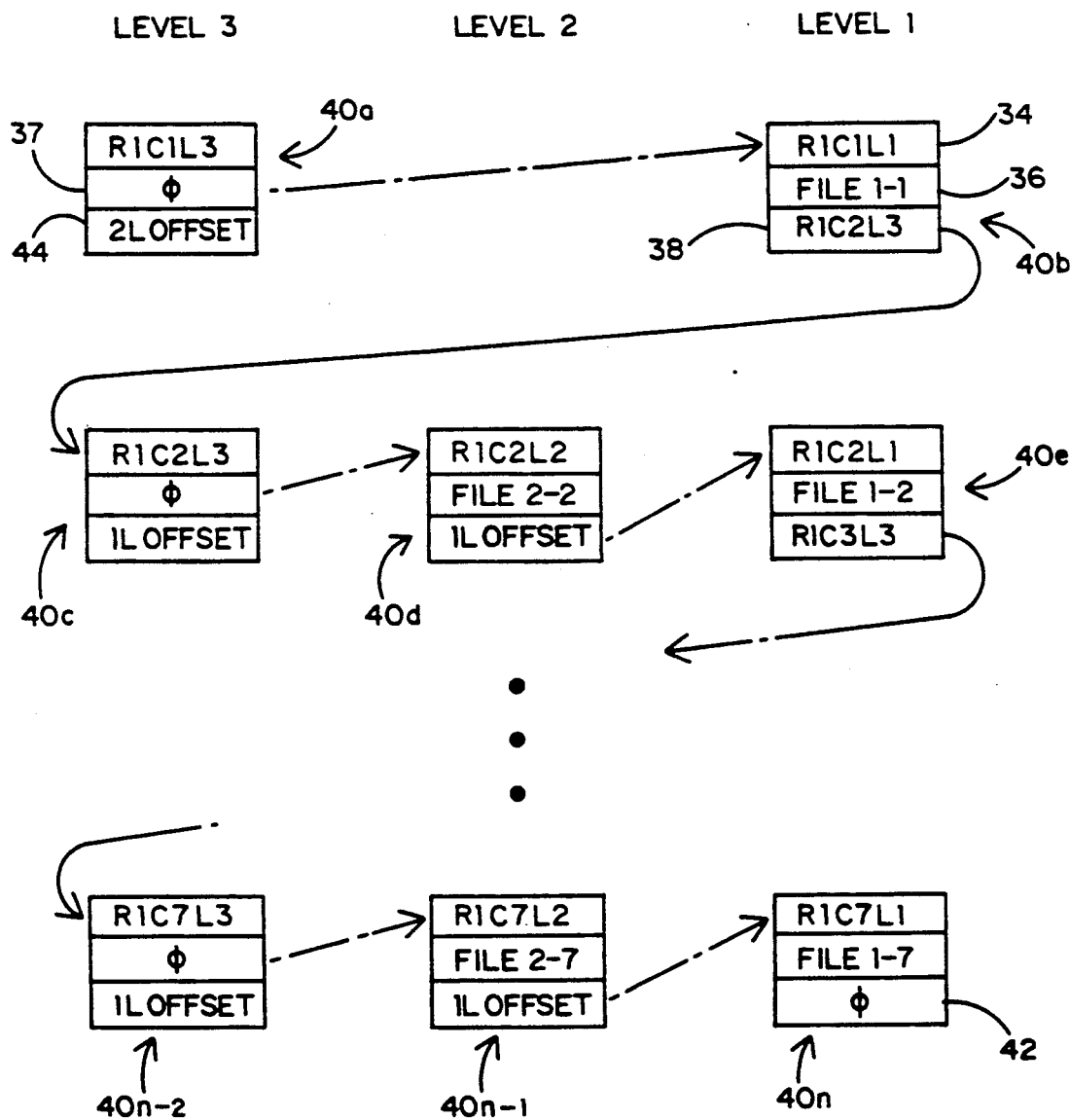
FIG. 4 is a readout diagram for producing a frame.

FIG. 4 illustrates the manner in which graphics from various files are combined to create a new file which is a combination of its component files. In FIG. 4, the function 19 is a linking function which ties together a series of cells for combination into a composite image.

Figure 5:
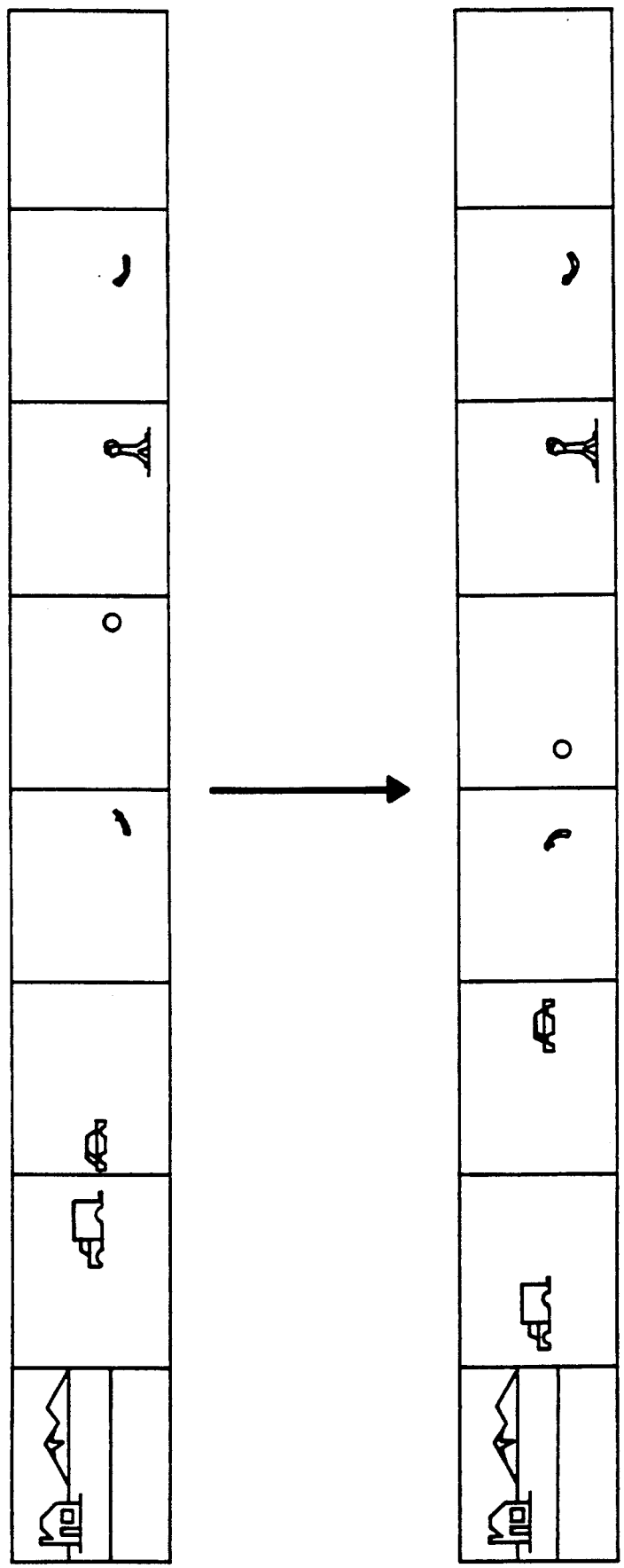
FIG. 5 is a partial representation of a window showing level 1 in a preferred illustrative embodiment.
Figure 6:
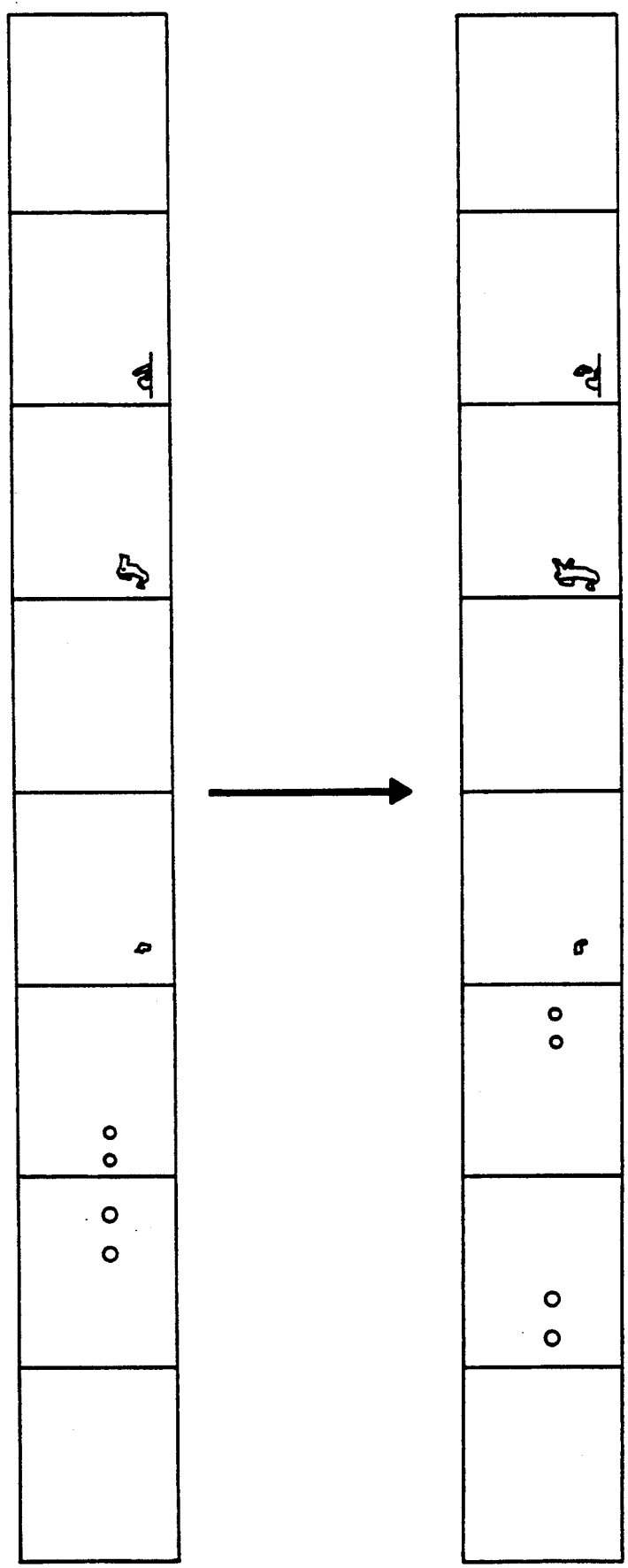
FIG. 6 is a partial representation of a window showing level 2 in a preferred illustrative embodiment.
Figure 7:
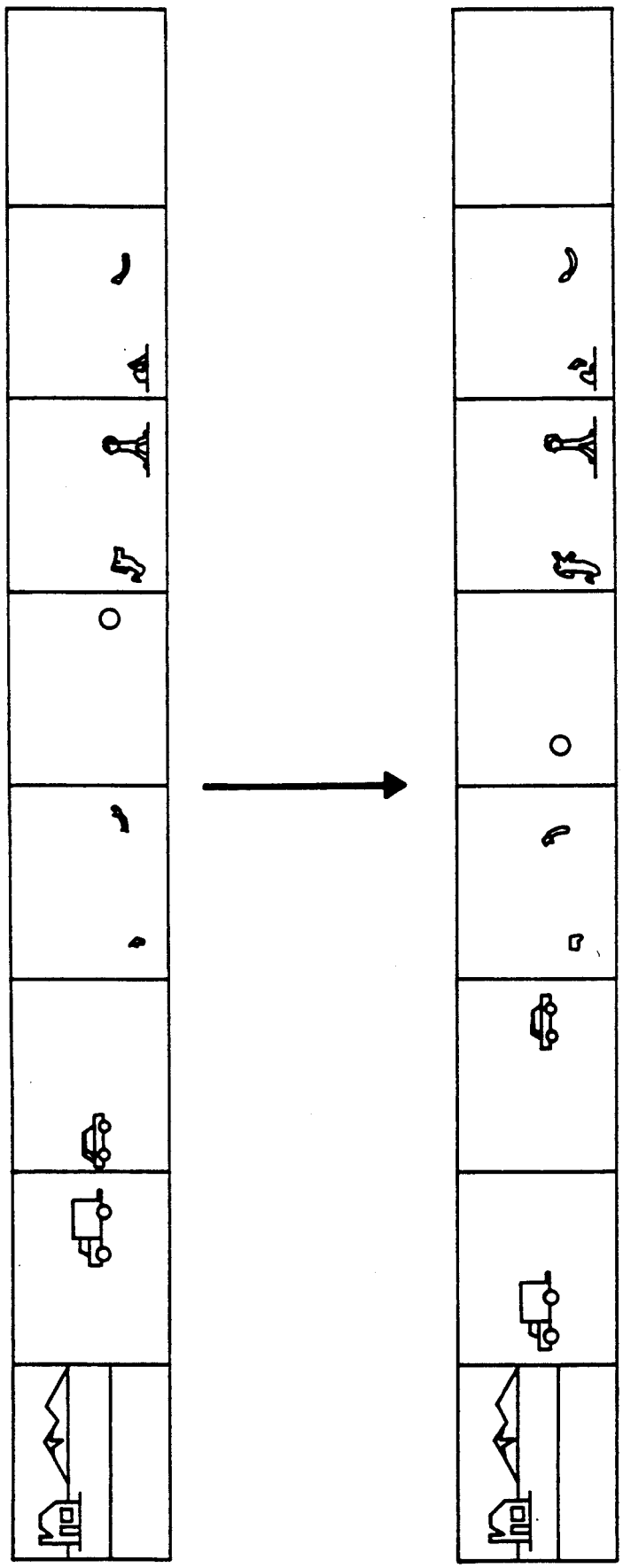
FIG. 7 is a partial representation of a window showing level 3 in a preferred embodiment.
Figure 8:
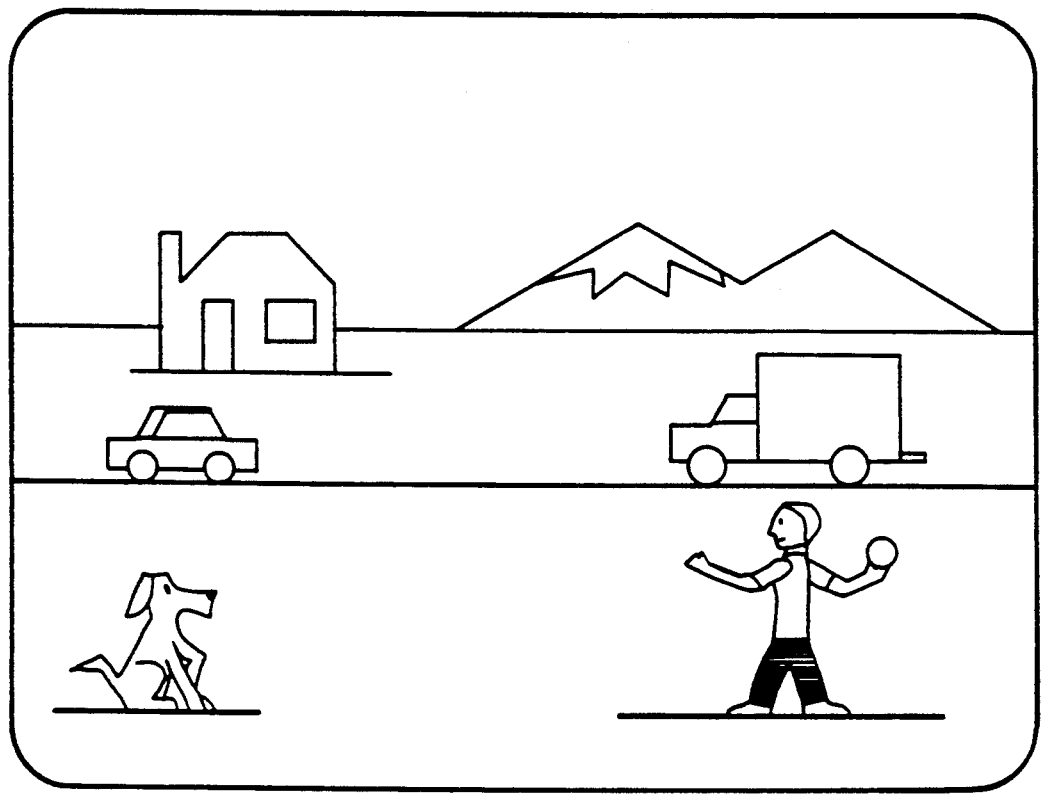
FIGS. 8 and 9 show frames derived by applying FIG. 4 to FIGS. 5-7.

If it is desired, for example, to combine the images of row 70 in FIG. 5 with those of the corresponding row in FIG. 6 to produce the composite images in the corresponding row of FIG. 7, and eventually to combine the composite images of FIG. 7 into the output image of FIG. 8, an appropriate operator selection of these images will cause the pertinent cells 27 of the matrix 32 to be linked in the manner shown in FIG. 4.

Because the first column (50 in FIG. 6) contains no graphic data, the first-row first-column level-3 (R1C1L3) cell of FIG. 7 (40a in FIG. 4) is linked by a two-level offset 44 directly to the corresponding R1C1L1 cell 40b associated with column 50 in FIG. 5. Cell 40b calls up the graphic (called File 1—1 in FIG. 4) shown in column 50 of row 70 of FIG. 5 and conveys it to the output buffer 21. Alternatively, the reference File 1—1 may also be entered in section 37 of cell 40a.

In the second column (52 in FIGS. 5–7), graphic data is associated with both cell 40d (corresponding to FIG. 5) and 40e (corresponding to FIG. 6). The program therefore conveys the File 2—2 graphic and the File 1-2 graphic to the output buffer 21, and combines these two graphics into a new file whose name can be entered in cell 40c.

This process is repeated for each of the columns of FIGS. 5–7. When the graphic of the last cell 40n has been conveyed to the output buffer and all the conveyed graphics have been superimposed on each other in the buffer, the buffer 21 contains the complete graphic of the output image of FIG. 8.

The back-to-front hierarchical order of the graphics in cells 40a through 40n (i.e. which graphic is hidden by a higher-order graphic) is dictated by the relative column addresses. Inasmuch as selections in a row are usually read from left to right in the window 24, the order of the graphics in a composite image or frame is preferably controlled by the relative left-to-right position of the individual images 25 in the window 24.

Graphic files to be manipulated by the dynamic directory of this invention may be created in a number of ways. For example, files to be used in successive rows of a given column may be successive video images recorded by a video camera; or they may be individual scans of a series of pictures; or they may be individual computerized drawings of picture components in successive positions.

Figure 9:
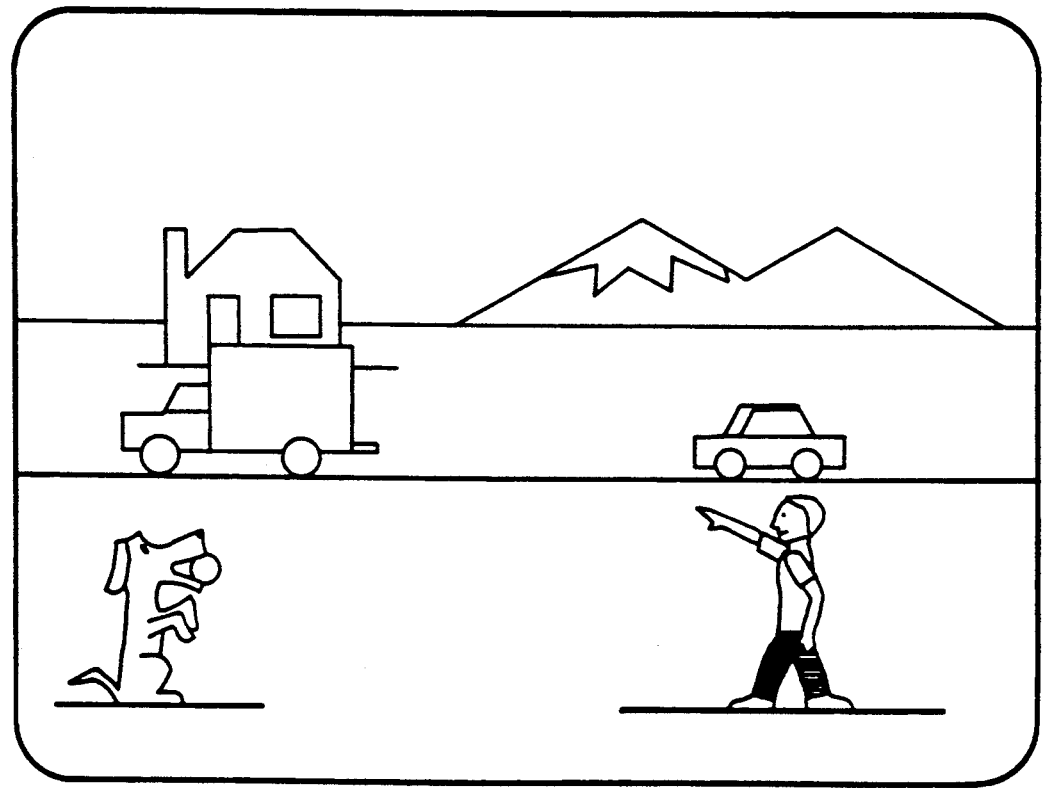

In order to create a moving output display, the output images beginning with that of FIG. 8 and ending with that of FIG. 9 are contained in cells 27 which are programmed with the further function of displaying each of the output images for 1/30 second in sequence. For editing purposes, this sequence may be set out in a sequence list (26 in FIGS. 2 and 5–7) which appears on the editing monitor 18 and identifies the frame with which a given row is associated.

In the example described herein, FIG. 8 shows the output image of the first frame of a 60-frame action sequence, and FIG. 9 shows the output image of the last frame of the sequence. FIG. 5 shows the level 1 components of these images, FIG. 6 the level 2 components, and FIG. 7 the level 3 components.

In all levels described in this example, the street background is in column 50 of the window 24; the truck, in column 52; the car in column 54; the child's right arm and leg, and the dog's left paws all in column 56; the ball in column 58; the child's and dog's bodies in column 60; and the child's left arm and leg; as well as the dog's right paws, in column 62. In the preferred embodiment, these placements are, of course, dictated by the relative back-to-front hierarchical values of these components.

The choice of levels in this example is a matter of convenience, the only criterion being that objects of the same order must not cross each other in the sequence. Thus, FIG. 5 shows the child in level 1. In row 70 (the first row of the sequence), cell 72 contains the initial position of the child's right hand, cell 74 the initial position of the body, and cell 76 the initial position of the child's left hand. In row 77, (the last row of the sequence) cells 78, 80 and 82, respectively, contain the final positions of those components in the sequence. The intermediate cells (not shown) are, of course, filled with the appropriate intermediate positions which can be simply created by, e.g., entering in each cell of each row following row 70 a function calling for reproducing the graphic of the above-adjacent cell with a stated displacement in a stated direction.

Level 2 in this example may be the dog (FIG. 6) with the same layout. Because the ball, car body, truck body and background all have different hierarchical values, they may be included in level 1. The car's wheels and the truck's wheels, which have different motions than their vehicles' bodies but may be of the same hierarchical value, are preferably in level 2.

Level 3 (FIG. 7) may be the combination of levels 1 and 2 into partial images. Each column of level 3 is selected by the operator, through an indexing program such as that of FIG. 4, to call up and superimpose therein the graphics of the corresponding columns 50 through 62 of levels 1 and 2. In this manner, each row of level 3 produces a complete frame when its cells are called out as described in connection with FIG. 4, and superimposed on each other in their proper hierarchical order, by the operator's display command.

Each complete frame (FIGS. 8 and 9) of the moving output display thus produced by the superposition of graphic data files in the manner of FIG. 4 may be temporarily stored in output buffer 21, from which the output device 22 can read it out.

It will be understood that the functions and procedures described above can be provided by conventional computer software produced by computer graphics programmers of ordinary skill, or by conventional hardware and manual operations.

It will be seen that the present invention provides a convenient method of causing graphic files to interact with each other in a wide variety of operator-selectable ways while at the same time providing a visual directory of the files for easy identification and selection. The invention is defined by the following claims and is not to be deemed limited by the illustrative example described above.

We claim:

1. A system for producing animated graphics, comprising:
   a) first memory means for storing a plurality of graphic files containing full-size component images to be assembled into a composite image by superposition upon one another;
   b) second memory means for establishing a matrix of cells;
   c) control means for associating selected cells of said matrix with selected ones of said graphic data files; and
   d) display means for displaying selected portions of said matrix, the cells within said displayed portions being displayed as an array of miniaturized images of the graphic data files associated with the cells of said displayed matrix portions.

2. A system as in claim 1 further comprising:
   e) means for selecting component images thus displayed; and
   f) means for producing a graphic file containing a composite image composed of a combination of said selected component images.

3. A system as in claim 2 further including:
   g) means for sequentially displaying a series of said composite images.

4. The system of claim 2, including means for combining said images in a hierarchical order determined by the position in said array of said miniaturized images.

5. The system of claim 2, including:
   g) means for combining selected images in a hierarchical order determined by a first dimension of said array; and
   h) means for sequentially reading out said combined images in a time sequence determined by a second dimension of said array.

6. The system of claim 5, in which said matrix is three-dimensional, and including:
   i) means for combining said images with images in corresponding cells of other levels of said matrix.

7. A method of visually manipulating large numbers of graphic data files on a computer, comprising the steps of:
   a) storing full-size files of graphic data;
   b) establishing in memory a matrix of cells;
   c) associating selected ones of said files with selected ones of said cells; and
   d) simultaneously displaying an array of miniaturized images of the files associated with a selected portion of said matrix.

8. The method of claim 7 further including:
   e) interactively manipulating said files by selecting said miniaturized images and selecting a function to be carried out thereon.

9. The method of claim 8, in which said function is the creation of a modified copy of a graphic file.

10. The method of claim 8, in which said function is the creation of a combination of a plurality of graphic files.

11. The method of claim 8, in which said function is a sequential output of a series of graphic files.

12. The method of claim 8, in which said function is a full-size display of a selected graphic file for editing.

13. The method of claim 8, in which said interactive manipulation includes combining selected images.

14. The method of claim 8, in which said function is time, and said method includes the further step of sequentially reading out selected images or combinations thereof at time intervals determined by said function.

15. The method of claim 7, including combining said images in a hierarchical order determined by the position in said array of said miniaturized images.

16. A method of producing a moving picture from component images contained in full-size graphic data files in a computer, comprising the steps of:
   a) storing said graphic data files;

b) displaying miniaturized images of said files in a first-level array of images, the display order of said miniaturized images in one dimension of said array being indicative of the hierarchical order of said images, and their display order in another dimension of said array being indicative of their sequence in time;

c) sequentially combining said images along said one dimension to produce frames of said moving picture; and d) sequentially reading out enlarged versions of said frames along said other dimension.

17. The method as in claim 16, further including:

e) displaying miniaturized images of said files in a second-level array of images, the display order of said miniaturized images in said one dimension of said array being indicative of the hierarchical order of said images, and their display order in said other dimension of said array being indicative of their sequence in time;

f) sequentially combining said first-level images with respective second-level images; and g) then sequentially combining said combined images along said one dimension to produce said frames of said moving picture.

18. A graphic spreadsheet, comprising:

a) means for storing a matrix of cells, each cell containing:
  i) a full-size graphic file containing the graphic attributes of graphic information contained therein;
  ii) information regarding a function to be carried out on said graphic file; and
  iii) linkage information capable of identifying other cells involved in the carrying out of said function; and b) means for selecting a portion of said matrix for display of the cells therein as an array of miniaturized versions of said graphic files; and c) means for selecting, for each cell selected for display, said function and said other cells.

19. The graphic spreadsheet of claim 18, in which the graphic files associated with the cells selected for display are arranged, when displayed, in rows and columns corresponding to the positions of their cells within said matrix, and said functions can be selected to be carried out in response to the position of said cell in said matrix.

20. The graphic spreadsheet of claim 19, in which said function can be selected to be carried out in response to both the position and the graphic attributes of said cell in said matrix.

21. The graphic spreadsheet of claim 18, in which said function can be selected to be carried out on selected graphic attributes of said graphic files.

* * * * *